US007887417B2

(12) United States Patent
Tyndall et al.

(10) Patent No.: US 7,887,417 B2
(45) Date of Patent: Feb. 15, 2011

(54) SYSTEM AND METHOD FOR CONTROLLING VOLUME ASSOCIATED WITH GAMING SYSTEM

(75) Inventors: Terry Tyndall, Las Vegas, NV (US); Martin Dempsey, Las Vegas, NV (US); Edward Sepich, Henderson, NV (US); Jeffrey George, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 1125 days.

(21) Appl. No.: 11/561,054

(22) Filed: Nov. 17, 2006

(65) Prior Publication Data

US 2007/0111800 A1 May 17, 2007

Related U.S. Application Data

(60) Provisional application No. 60/737,503, filed on Nov. 17, 2005.

(51) Int. Cl.
*A63F 13/12* (2006.01)

(52) U.S. Cl. .......................................... 463/35; 463/29

(58) Field of Classification Search .................. 463/35, 463/29

See application file for complete search history.

(56) References Cited

U.S. PATENT DOCUMENTS

| | | | | |
|---|---|---|---|---|
| 5,242,163 | A | 9/1993 | Fulton | |
| 6,270,410 | B1 | 8/2001 | DeMar et al. | |
| 6,354,943 | B1 | 3/2002 | Miura | |
| 6,638,169 | B2 | 10/2003 | Wilder et al. | |
| 6,671,757 | B1 * | 12/2003 | Multer et al. | 710/100 |
| 6,794,992 | B1 | 9/2004 | Rogers | |
| 6,805,633 | B2 | 10/2004 | Hein, Jr. et al. | |
| 6,884,173 | B2 * | 4/2005 | Gauselmann | 463/42 |
| 2002/0142846 | A1 | 10/2002 | Paulsen | |

(Continued)

FOREIGN PATENT DOCUMENTS

JP 2005124693 A 5/2005

OTHER PUBLICATIONS

"USA Casino", source(s): http://www.usacasino.com/index2.php?p=istarted.php&id=1.

(Continued)

*Primary Examiner*—James S McClellan
*Assistant Examiner*—Allen Chan
(74) *Attorney, Agent, or Firm*—Howard & Howard Attorneys PLLC

(57) ABSTRACT

A gaming system for playing a game and processing currency includes a plurality of player interaction terminals adaptable for determining a winning outcome of the game and receiving and processing the currency and discharging the currency in response to the winning outcome of the game. Each player interaction terminal generates various sounds as the game is played and as the winning outcome is determined. A controller operably communicates with each of the player interaction terminals. A tracking device communicates with each of the player interaction terminals and the controller and is held by a casino attendant who moves the tracking device relative each of the player interaction terminals for selectively adjusting the sounds of each of the player interaction terminals and to synch and/or mute or dial down the volume so that a general message, such as, for example an emergency message, may be broadcast.

21 Claims, 4 Drawing Sheets

U.S. PATENT DOCUMENTS

| | | | | |
|---|---|---|---|---|
| 2002/0151366 | A1 | 10/2002 | Walker et al. | |
| 2003/0054881 | A1 * | 3/2003 | Hedrick et al. | 463/29 |
| 2003/0114214 | A1 | 6/2003 | Barahona et al. | |
| 2004/0072611 | A1 | 4/2004 | Wolf et al. | |
| 2004/0142747 | A1 | 7/2004 | Pryzby | |
| 2004/0209676 | A1 | 10/2004 | Onishi et al. | |
| 2005/0032575 | A1 | 2/2005 | Goforth et al. | |
| 2005/0043090 | A1 | 2/2005 | Pryzby et al. | |
| 2005/0051021 | A1 | 3/2005 | Laakso | |
| 2005/0054441 | A1 | 3/2005 | Landrum et al. | |
| 2005/0096125 | A1 | 5/2005 | LeMay et al. | |
| 2005/0159832 | A1 * | 7/2005 | Umeo et al. | 700/94 |
| 2005/0164785 | A1 | 7/2005 | Connelly | |
| 2005/0192092 | A1 | 9/2005 | Breckner et al. | |
| 2005/0239545 | A1 | 10/2005 | Rowe | |
| 2005/0239546 | A1 | 10/2005 | Hedrick et al. | |
| 2005/0261063 | A1 | 11/2005 | Boyd et al. | |
| 2005/0277469 | A1 | 12/2005 | Pryzby et al. | |
| 2006/0009285 | A1 | 1/2006 | Pryzby et al. | |
| 2006/0018208 | A1 | 1/2006 | Nathan et al. | |
| 2006/0029232 | A1 | 2/2006 | Boyd | |
| 2006/0062094 | A1 | 3/2006 | Nathan et al. | |

OTHER PUBLICATIONS

"Slot Imports", source(s): http://www.slotimports.com/Support/troubleshooting.shtm.

"Game Park", source(s): http://www.geocities.com/vlassissa2000/gamepark_en.pdf.

"Pachislo Owners Manual", source(s): www.stealthhomeamusement.com.

* cited by examiner

SYSTEM AND METHOD FOR CONTROLLING VOLUME ASSOCIATED WITH GAMING SYSTEM

RELATED APPLICATIONS

This application claims the benefit of application Ser. No. 60/737,503 filed on Nov. 17, 2005, the specification of which is hereby incorporated by reference.

FIELD OF THE INVENTION

The present invention relates generally to gaming machines, and more particularly, to a system and method for controlling a volume associated with a gaming machine.

BACKGROUND OF THE INVENTION

The growth and competition in the casino gaming market in recent years and the increasingly sophisticated and complex technology being integrated into the gaming environment, at the individual game, casino management, and auditing levels, presents both challenges and opportunities to game manufacturers, gaming establishment operators, and regulatory agencies. The technological capabilities and requirements of, for example, advanced electronic games, multi-site gaming operations, detailed player tracking, wide area progressive jackpots, and various alternatives to the use of currency and coins by players, all present a potentially huge pool of ever-changing data which can be of great value to casino operators (from a management standpoint) and to regulators from an audit/compliance standpoint.

Players may also be given an incentive through a player tracking club. Usually, a player is identified during play by a player tracking ID card and/or a player identification number (PIN). The player tracking system tracks the player's play and awards player tracking points according to established criteria. The player tracking points may be redeemed for prizes, such as complimentary meals or merchandise.

Typically, the player tracking system is accessed at a gaming machine, such as a slot machine, via a player tracking device or unit. Such device is commonly equipped with one or more speakers which are used to emit sounds associated with the player tracking system.

The gaming machines, such as mechanical reel slots and/or video slots, have one or more speakers which are used to emit sounds which are related to the game played on the gaming machine. Sounds may be played through the gaming machine's speakers both while a game is being played and while the game is not being played. These gaming machines are typically arranged in groups of similar machines or those from the same manufacturer, i.e., banks of machines. Additionally, the banks of machines may be located in a defined area or areas of a casino, i.e., zones. With a large number of the gaming machines grouped in a large number of banks, wherein each gaming machine emits sounds through its speakers, and wherein each gaming machine has a player tracking device emitting sounds through its own speaker(s), it may become very difficult to distinguish sounds from one of the aforementioned gaming machines or one of the player tracking devices from others.

United States Patent Application Publication No. 2004/0142747 to Pryzby, for example, shows a wagering gaming system comprising a gaming terminal and a sound processing system. The gaming terminal conducts a wagering game and a player is allowed to select sound preferences in connection with the wagering game. A touch panel displays a sound preferences button which has a menu including a sound field effect button, a system sounds button, a speaker settings button, and a volume settings button. The wagering gaming system allows anyone to raise and/or lower the sound, which creates numerous problems, when, for example, another players at the adjacent gaming terminal are uncomfortable by the level of sound or have difficulties to hear the broadcast of various general message, such as, for example, an emergency message.

Furthermore, United States Patent Application Publication No. 2005/0261063 to Boyd shows a content manager feature including global controls, e.g., volume and display contrast across the entire floor. As best illustrated in FIG. 11, the sequence for adjusting the global volume parameter for a group of machines. A user would position the cursor at the configuration workstation and click on the global volume item on the General settings list. A drop down menu would then be presented with several selectable values for global volume. A setting of 'Level 0' signifies no sound and 'Level 7' signifies a maximum volume level with 'Level 3' being the default. Selection of the specified volume and then clicking on the 'Export' button configures and transmits a file to the proper gaming machines which adjust the volume of the gaming machine appropriate to the instruction(s) contained within the received. It is important to know that the user is located at an isolated and pre-determined position substantially away from the gaming machines. Moreover, the user does not hear the sound of the gaming machines as the volume is adjusted and has to rely on the aforementioned selection of the specified volume.

In addition, the U.S. Pat. No. 6,805,633 to Hein et al. shows a system and method for automatically adjusting the sound volume of a gaming machine based on the ambient noise level to an appropriate level. The gaming machine may implement an open loop control algorithm when the machine's sound output is inactive as determined, e.g., by software, or by analyzing samples from a soundboard. A closed loop control algorithm may be implemented when the gaming machine is active. Alternatively, the machine may implement only an open loop algorithm that provides volume adjustment only when the machine's sound output is inactive, in which case the adjusted volume is maintained through an active period, then adjusted again at the next inactive period. Saturation back off feature prevents the sound level of the gaming machine from escalating to, and remains at, a maximum, saturation level. Similarly to the wagering gaming system taught by the United States Patent Application Publication No. 2004/0142747 to Pryzby, this system and method for automatically adjusting the sound volume of the gaming machine allows the player but not a casino attendant to raise the sound, which creates numerous problems, when, for example, another players at the adjacent gaming terminal are uncomfortable by the level of sound or have difficulties to hear the broadcast of various general message, such as, for example, an emergency message.

Alluding to the above, U.S. Pat. No. 5,242,163 to Fulton shows a casino game system which allows a person playing a first gaming device, such as a video gaming device, to play a conventional group oriented game. e.g. bingo, without leaving the first gaming device. A control station is placed in communication with the gaming devices. The sound generating means of the plurality of gaming devices is responsive to the control station such that the volume of the sound corresponding to the first game can be reduced at the beginning of a bingo session, in response to a signal from the control station. The control station is isolated from the gaming devices. An operator positioned at the control station and away from the gaming devices and has to rely on the aforementioned sound generating means.

But even, if it is practicable, there is a constant need for improvements in the area of system and method for controlling a volume associated with a gaming machine. The present invention is aimed at one or more of the problems as set forth above.

SUMMARY OF THE INVENTION

In one aspect of the present invention, a gaming system for playing a game and processing currency includes a plurality of player interaction terminals adaptable for determining a winning outcome of the game and receiving and processing the currency and discharging the currency in response to the winning outcome of the game. Each player interaction terminal generates various sounds as the game is played and as the winning outcome is determined. A controller operably communicates with each of the player interaction terminals. A tracking device communicates with each of the player interaction terminals and the controller. The tracking device is held by a casino attendant who moves the same relative each of the player interaction terminals for selectively adjusting the sounds of each of the player interaction terminals.

In a second aspect of the present invention, a gaming system for playing a game and processing currency includes a plurality of player interaction terminals adaptable for determining a winning outcome of the game and receiving and processing the currency and discharging the currency in response to the winning outcome of the game. Each player interaction terminal generates various sounds as the game is played and as the winning outcome is determined. A controller presents a bank of pre-determined levels and types of the sounds and communicates with each of the player interaction terminals. At least one tracking device presents an operative communication with the controller and the player interaction terminals. The tracking device is held by a casino attendant who moves the same relative each of the player interaction terminals for selectively adjusting the pre-determined levels and types of the sounds of each of the player interaction terminals.

In a third aspect of the present invention, a gaming system is adaptable for entertaining visitors playing various games by determining a winning outcome of the games played and awarding the visitors in response to the winning outcome of the games played. The gaming system includes a structure, such as a casino building, a casino "floor", or any other establishment with a plurality of player interaction terminals disposed inside the closure and adjacent one and the other with each of said player interaction terminals adaptable for determining the winning outcome of the game and receiving and processing the currency and discharging the currency in response to the winning outcome of the game and generating sounds as the game is played and as the winning outcome is determined. A controller operably communicates with each of the player interaction terminals and presents a bank of pre-determined levels and types of the sounds. At least one tracking device presents an operative communication with the controller and the player interaction terminals.

In a fourth aspect of the present invention, a remote system for use with a gaming system having at least one gaming machine playable by a player is provided. The gaming machine includes at least one associated speaker. The system includes a remote device and a controller. The remote device is embodied in a mobile computer which may be carried by a user. The controller is in operably communication with the gaming machine and the remote device, receives signals from the remote device and controls a sound level associated with the speaker associated with the at least one gaming machine in response to commands input by the user on the remote device.

In a fifth aspect of the present invention, a system for use with a gaming system having at least one gaming machine playable by a player and having an associated player tracking device is provided. The gaming machine has at least one associated game speaker. The associated player tracking device has an associated player tracking speaker. The system includes a device for use by a user and a controller. The controller operably communicates with the gaming machine and the remote device for receiving signals from the remote device and for selectively controlling a sound level associated with the gaming speaker and/or the player tacking speaker in response to commands input by the user on the device.

In a fifth aspect of the present invention, a method of controlling a sound level associated with a speaker associated with a gaming machine of a gaming system is provided. The method includes the steps of providing a remote device embodied in a mobile computer which may be carried by a user, receiving commands input by the user onto the remote device and relaying the commands to a controller; and receiving the commands at the controller and controlling the sound level associated with the speaker associated with the at least one gaming machine in response to commands input by the user on the remote device.

In a sixth aspect of the present invention, a method for use with a gaming system having at least one gaming machine playable by a player and having an associated player tracking device is provided. The gaming machine has at least one associated game speaker. The associated player tracking device has an associated player tracking speaker. The method includes the steps of providing a device for use by a user, receiving commands input by the user onto the device and relaying the commands to a controller, and receiving the commands at the controller and selectively controlling a sound level associated with the gaming speaker and/or the player tacking speaker in response to commands input by the user on the device.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Figure 6:
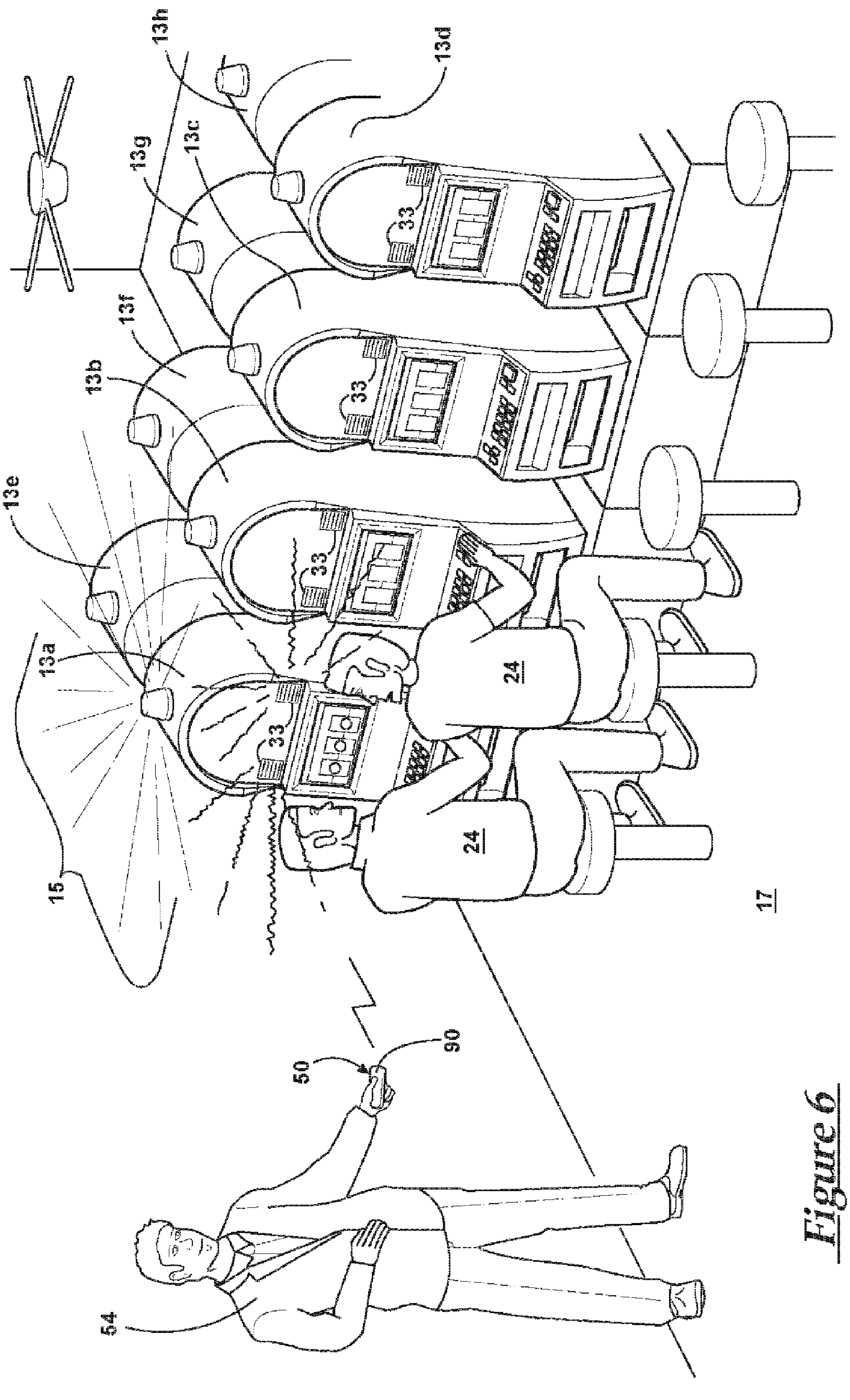
FIG. 6 illustrates a gaming establishment with a plurality of gaming machines and the inventive remote device held by a casino attendant adjusting volume of at least one of the gaming machines as the casino attendant moves therebetween.

With reference to the drawings and in operation, the present invention provides a system, generally shown at 10 and methods related to a method or to one or more gaming devices, generally shown at 12. The gaming devices 12 may be electronic or electric gaming machines or player interaction terminals 13A-13I, such as slot or video slot machines, poker or video poker machines, arcade or video arcade games, as best illustrated in FIG. 6, and the like, but may also include other types of devices 12A connected to the system 10, such as virtual gaming machines (for online gaming), electronic interfaces for use with table games, vending machines, token or credit dispensing machines, ticket redemption machines, or any other electric or electronic device connected to the network. The electronic gaming machines 13A-13I may be adaptable for determining a winning outcome of the game and receiving and processing the currency, such as the coins, tokens, and the like, and discharging the currency in response to the winning outcome of the game. The electronic gaming machines 13A-13I may also adaptable to generate sounds as the game is played and as the winning outcome is determined.

Figure 1:
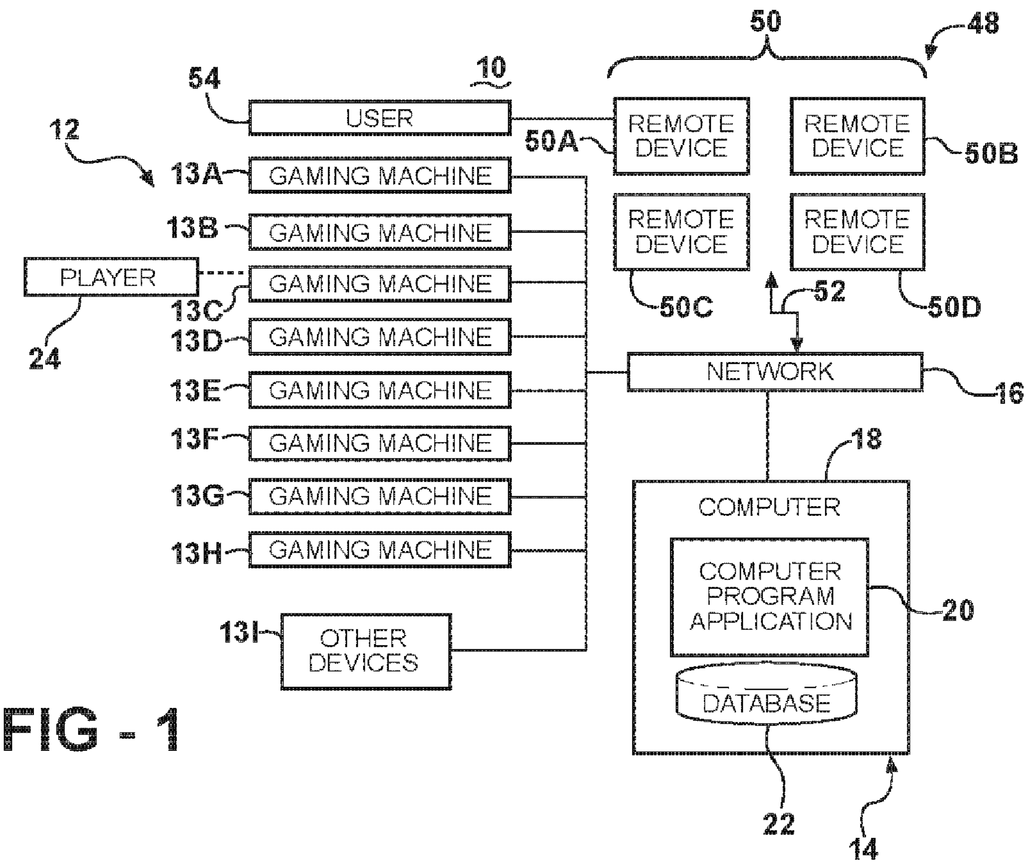
FIG. 1 illustrates a block diagram of a remote system for use with a gaming system, according to an embodiment of the present invention.

In one embodiment, the system 10 and methods may be embodied or implemented via an entertaining management and monitoring system or gaming system 14, which is shown in block diagram form in FIG. 1. The entertainment and monitoring system 14 may include may additional functions such as, a real-time multi-site, a slot accounting, a player tracking, cage credit and vault, a sports book data collection, Point of Sale (POS) accounting, a keno accounting, a bingo accounting, and a table game accounting, a wide area progressive jackpot, and an electronic funds transfer (EFT). An exemplary system is disclosed in U.S. patent application Ser. No. 09/967,571, filed Sep. 28, 2001, which is hereby incorporated by reference.

In the illustrated embodiment, the system 10 includes eight electronic gaming machines 13A-13I, schematically shown in FIG. 1 and graphically illustrated in FIG. 6. However, it should be noted that the present invention is not limited to any number of devices 12 or machines 13. In one embodiment, the machines 13 are organized into banks, as shown in FIG. 6, with each bank containing a plurality of the gaming machines 13. Banks of machines may be organized into zones 15 of a casino floor 17.

The gaming devices 13A-13I are connected via a network 16 to one or more host computers 18, which are generally located at a remote or central location. The computer 18 includes a computer program application 20 which maintains one or more databases 22. In one embodiment, the database(s) are Oracle database(s). Numerous other suitable databases may be used and the aforementioned Oracle database is not intended to limit the scope of the present invention. Ye computer program application 20 may include software with a plurality of pre-determined levels and variations of sounds transmitted through and by the gaming machines 13A-13I. The computer program application 20 and the databases 22 may be used to record, track, and report accounting information regarding the gaming machines 13A-13I and/or users of the gaming devices 13A-13I or a players 24 of the electronic gaming machines 13. Additionally, the computer program application 20 and databases 22 may be used to maintain information related to player tracking accounts, described in great detailed further below.

Alluding to the above, the gaming machines 13A-13I are playable by the player 24, as shown in FIG. 6. The player 24 may select one of the electronic gaming machines 13C to play and insert a coin, credit, coupon, and/or player tracking card (not shown) into the chosen gaming machine 13C. Generally, the electronic gaming machines 13C have an associated number of credits or coins required in order to play. In the case of video slot or poker games, the game is played and an award in the form of credits may be awarded based on a pay table of the gaming machine 13.

Figure 2:
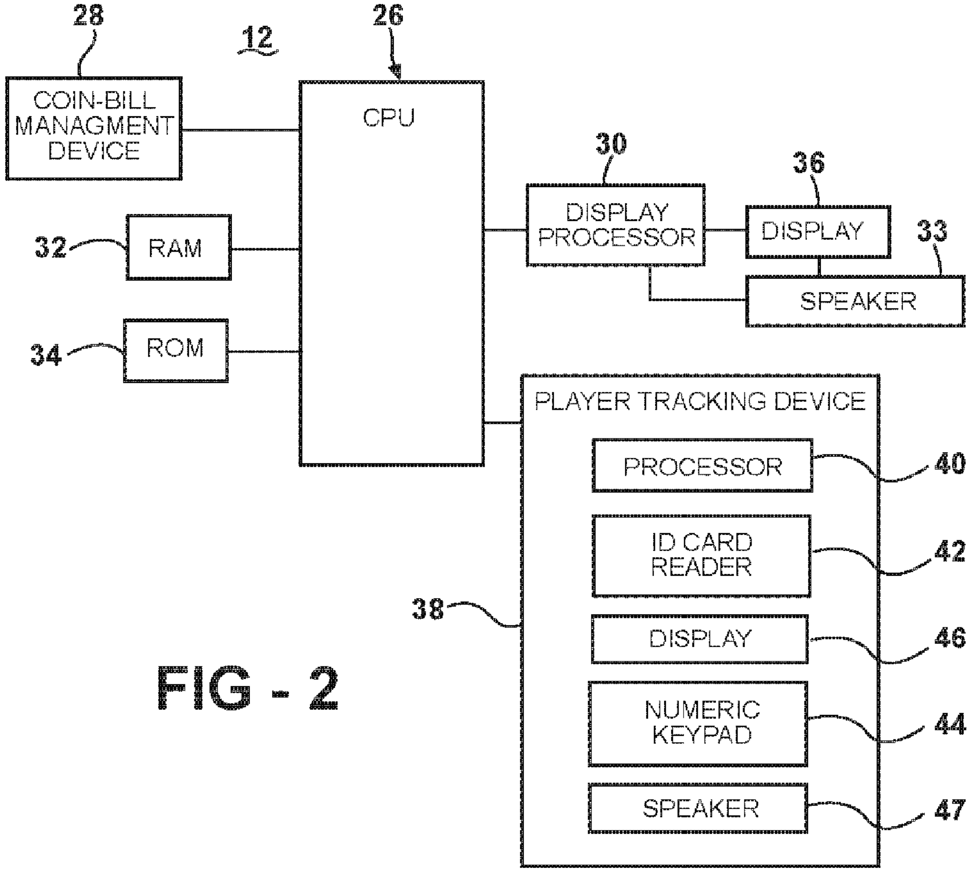
FIG. 2 illustrates a block diagram of an gaming machine and a remote device, according to an embodiment of the present invention.

Alluding to the above, FIG. 2 illustrates a block diagram of a suitable electronic gaming machine 13, as for example the electronic gaming machine 13C. The machine 13C includes a game controller 26 or central processing unit (CPU), a coin-bill management device 28, a display processor 30, a RAM 32 as a memory device and a ROM 34 (generally provided as an EPROM). The CPU 26 is mainly composed of a microprocessor unit and performs various calculations and motion control necessary for the progress of the game. The coin-bill management device 28 detects the insertion of a coin or a bill and performs a necessary process for managing the coin and the bill. The display processor 30 interprets commands issued from the CPU 26 and displays desirable images on a display 36. The RAM 32 temporarily stores programs and data necessary for the progress of the game, and the ROM 34 stores, in advance, programs and data for controlling basic operation of the machine 12C, such as the booting operation thereof, game code and graphics. Input to the gaming device 13C may be accomplished via mechanical switches or buttons or via a touchscreen interface (not shown). Such gaming machines 12 are well known in the art and are therefore not further discussed.

The player 24 is identified via the player tracking card and/or a player identification number entered into a player tracking or interface device 38 at each gaming machine 12 (see below). Player tracking accounts may be used, generally, to provide bonuses to a player, in addition to the award designated by, in the case of a video slot or poker machine, a paytable of the gaming machine 13C. These bonuses may be awarded to the player 24 based a set of criteria, including, but not limited to a the player's play on the machine 13C, the player's overall play, a play during a predetermined period of time, and the player's 24 birthday or anniversary, or any other definable criteria. Additionally, bonuses may be awarded on a random basis, i.e., to a randomly chosen player 24 or randomly chosen game 12. Bonuses may also be awarded in a discretionary manner or based on other criteria, such as, purchases made at a gift shop or other affiliated location.

In one embodiment, the player tracking device 38 includes a processor 40, a player identification card reader 42 and/or a numeric keypad 44, and a display 46. In one embodiment, the display 46 is a touchscreen panel and the numeric keypad 44 is implemented thereon. Those skilled in the art will appreciate that other types and configurations of the display 46 may be used with the present invention and are not intended to limit the scope of the inventive concept.

The player 24 may be identified by entry of a player tracking card into the player identification card reader 42 and/or entry of a player identification number (PIN) on the numeric keypad 44. The play tracking device 38 may also be used to communicate information between the computer 18 and the corresponding gaming machine 13C. The player tracking device 38 may also be used to track bonus points, i.e., incentive points or credits, downloaded from the computer 18.

In one aspect of the present invention, the bonuses are awarded as bonus points. In one embodiment, the bonus points are incentive points. In another embodiment, the bonus points are credits. The incentive points may be converted to credits using a predetermined ratio. The predetermined ratio may be 1 or any other desired ratio. The predetermined ratio may also be varied based on determined criteria, e.g., the gaming machine 12 being played, the player, or the time of day. Incentive points may be designated as cashable or non-cashable. The incentive points in a player account may be downloaded to one of the gaming machines 12 for play.

Alluding to the above, a remote system of the gaming system 14 is generally shown at 48 in FIG. 1. The remote system 48 provides access to various features or functions of the gaming system 14 by a remote or tracking device, generally indicated at 50 in FIG. 6. In the illustrated embodiment, there are four remote devices 50A, 50B, 50C, 50D, however, this is for discussion purposes only and without limiting the scope of the present invention. Any number of remotes devices 50 may be included. Each remote device 50A, 50B, 50C, and 50D is connected to the network 16 through a network link 52. Each remote device 50A, 50B, 50C, 50D communicates with the computer 18 through the network link 52 and the network 16 and is remotely movable relative the electronic gaming machines 13A-13H for selectively adjusting the pre-determined levels and types of the sounds of each of each of the electronic gaming machines 13A-13I. In one aspect of the present invention, the network link 52 is a wireless connection. In one embodiment, the wireless connection uses the IEEE 802.11 standard, e.g., 802.11b or 802.11g. However, it should be noted that wireless links using other standards may also be used where appropriate, such as a short range radio link (e.g., a link using the technology known as "Blue Tooth"). In another aspect of the present invention, the network link 52 may be a wire link. The type and configuration of the network link 52

Each of the remote devices 50A, 50B, 50C, 50D is generally used by a user 54 and provides, as discussed below, access to various data and/or functions of the gaming system 14. In one aspect, the user 54 is an employee of the gaming established where the gaming system 14 is operating, as illustrated in FIG. 6. Typically, the user 54 has an assigned role (or type) based on their job description. Typical roles may include, but are not limited to, system administrator, supervisor, pit, pit manager, slot floor employee, patron host, player's club, security, security supervisor, slot attendant, slot director, slot shift supervisor, slot technician, sports and race-book, surveillance, and table supervisor.

In one embodiment of the present invention, the remote devices 50A, 50B, 50C, 50D provide access to one or more types of data and/or one or more functions based on the assigned role of the user 54. In one embodiment, the remote device 50 may provide access to one or more of the following functions: remote patron signup, remote patron information, remote device information, remote cash ticket processing, remote jackpot ticket processing, remote hopper fill ticket processing, remote table rating interface, remote attendance, remote surveillance, adjusting a player's bonus or comp points, issuing comp vouchers to a player, redeeming printed vouchers, listing and redeeming outstanding vouchers assigned to a player, and retrieving and displaying information related to the remote device 50. Each of these functions is described more fully below.

In one embodiment of the present invention, for example, the remote device 50 may be a mobile computer based on the PALM operating system or Microsoft Windows operating system, as shown in FIG. 6. With specific reference to FIG. 3 in one embodiment of the present invention, the remote device 50A includes a processor 58, a memory 60 for storing applications and data, and a display 64. The display 64 may be a touchscreen display. The remote device 50A may also include a bar code reader 66. The bar code reader 66 may be used to read a player ID card number from the ID card or to read a device ID number from the device 12. One such mobile computer is available from Symbol Technologies, Inc. of Holtsville, N.Y. as model number SPT 1800. the type and configuration of the mobile computer is not intended to limit the scope of the present invention. Additionally or alternatively, the remote device 50A may include an ID card reader 62 capable of reading magnetic stripe ID cards. Alternatively, the remote devices 50 may also include a desktop computer, a laptop computer, a notebook computer, and/or a sub-notebook computer, without limiting the scope of the present invention.

Returning to FIG. 3, in one embodiment of the present invention, the remote device 50A includes a web client 56 which is stored in the memory 60 and run on the processor 58. The web client 56 is connected to the computer program application 20 running on the host computer 18 through the network link 52. All interaction with the user 54, including the display of data and queries and the input of data, is handled by the web client 56. The web client 56 is responsible for acquiring user input, e.g., through forms, and formatting and presenting information to the user 54. The web client 56 is a computer application which is accessed via a web browser, such as Microsoft Internet Explorer, available from Microsoft Corp., of Redmond Calif. The web client 56 may be written in Hypertext Mark-Up Language (HTML) and include one or more servlets (see below) which may be written in a computer programming language, such as Java.

Figure 3:
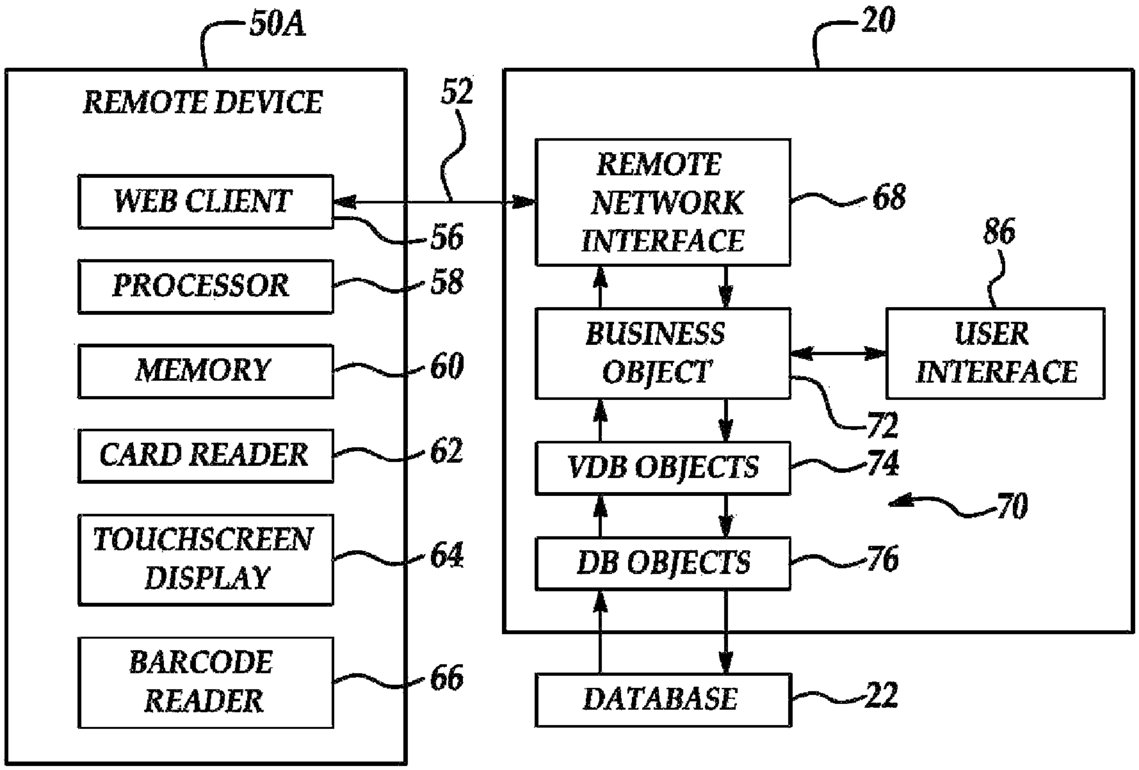
FIG. 3 illustrates a detailed view of the block diagram of the remote device of FIG. 2 and a computer program application, according to an embodiment of the present invention.

As shown in FIG. 3, the computer program application 20 implements a remote network interface 68. The remote network interface 68 couples the web client 56 with the database 22. In one embodiment, the remote network interface 68 obtains data from the database 22, formats the data, e.g., into an HTML response, and returns the formatted data to the web client 56. The remote network interface 68 of the present invention is coupled to the database 22 by one or more data objects 70. In one embodiment, data is stored in the database 22 in data tables. The data objects 70 handle requests from the remote network interface 68, abstracts the required data from the database tables and/or sets data into the database tables.

As further shown, in FIG. 3, the data objects 70 include a plurality of first data object (DBOBJECTS) 76, at least one second data object (VDBOBJECTS) 74, and a third data object (BUSINESS OBJECT) 72. The first data objects 76 are coupled to the database tables and abstract specific database tables for the at least one second data object 74. The first data objects 76 handle retrieving and setting data into specific database tables. The at least one second data object 74 is coupled to the first data objects 76 assemble multiple first data objects 76 into a single third data object 72. The at least one second data object 74 abstract the third data object 72 from the database tables. The third data object 72 is coupled to the at least one second data object 74. The third data object receives queries from the remote network interface, retrieves responsive data from the database through the first and second data objects 74, 76, formats the responsive data and returns the responsive data to the remote network interface.

Figure 4:
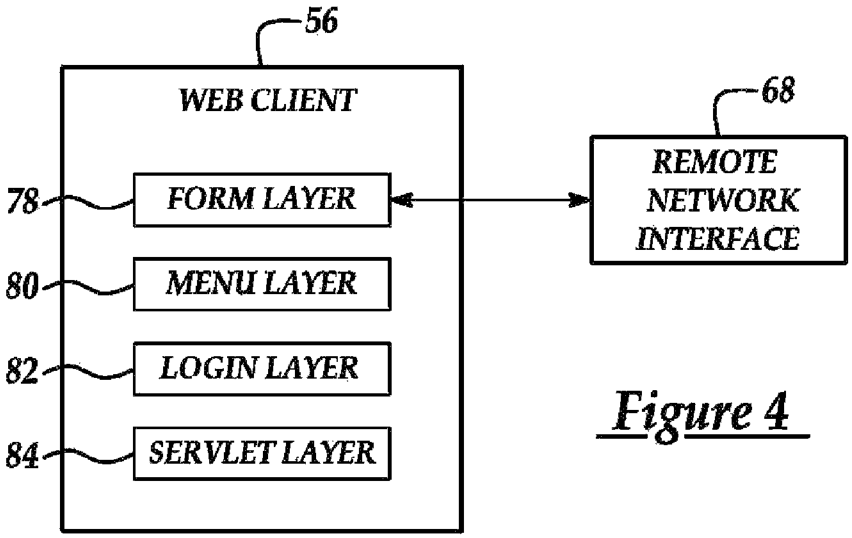
FIG. 4 illustrates a block diagram of a web client operating on the remote device of FIG. 2, according to an embodiment of the present invention.

With reference to FIG. 4 in one embodiment, the web client 56 is written in HTML. In the illustrated embodiment, the web client 56 includes a form layer 78, a menu layer 80, a login layer 82, and a servlet layer 84. The login layer 82 provides security. It allows the user 54 to logon to the remote system 48. In one embodiment, the user 54 enters a name and password to logon. The user 54 may also be required to enter or select the site at which the user 54 is located.

Figure 5:
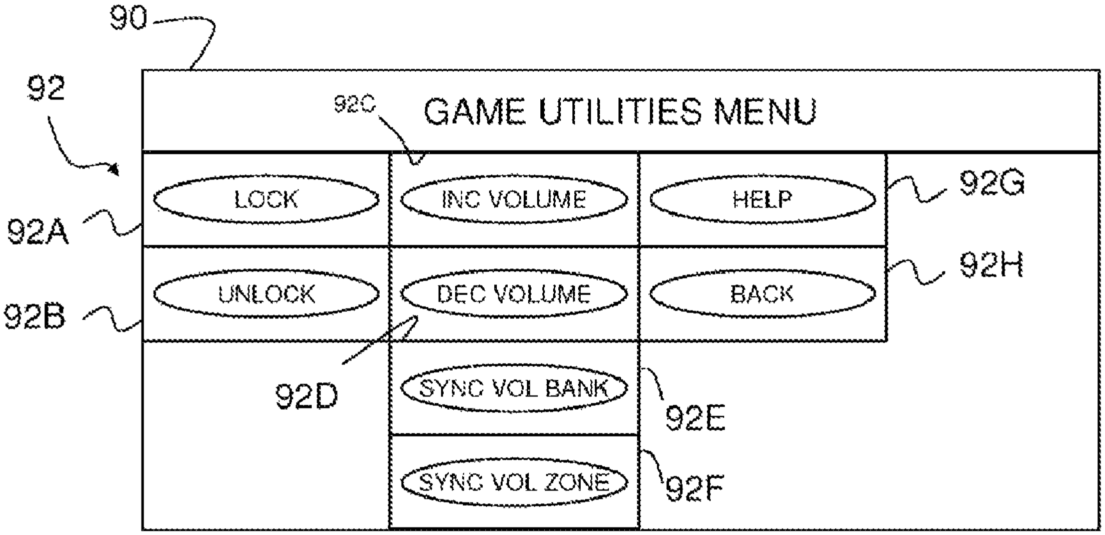
FIG. 5 is a diagrammatic illustration of a game utilities menu for controlling a volume associated with a gaming machine or player tracking device, according to an embodiment of the present invention.

Alluding to the above, the remote device 50 defines a housing 90, as best shown in FIG. 6, having a game utilities menu defined by a menu layer, generally shown at 92 in FIG. 5. The menu layer 92 allows the user 54, once logged on, to navigate to and between servlets. The servlets are downloaded to the remote device 50 from the computer 18 as needed. The menu layer 92 also handles providing access to those servlets to which the user 54 has access, typically based on an assigned role (see above). The form and servlet layers 78, 84 provides common functionality for the servlets. The game utilities menu 92 allows a volume associated with the gaming machines 13A-13I and/or the player tracking devices 38. The game utilities menu 92 may also be provided at one or more workstation connected to the system 10. The game utilities menu 92 is adaptable to increase volume of player tracking system for globally broadcast emergency message or as other announcements sound.

Each gaming machine 13A-13I includes one or more speakers 33 for emitting sounds that are associated with the gaming machine 13A-13H. Each player tracking device 38 may include one or more speakers 47 for emitting sounds associated with the player tracking system.

The game utilities menu 92 provides a plurality of buttons 92A through H, which may be implemented on the touch-screen display 46 of the player interface device 38 or the user interface 86 of one of the remote devices 50. In one embodiment, the game utilities menu 92 may provide the player 24 or the user 54 to modify the volume associated with one of the gaming machines and/or the volume associated with a player tracking device associated with one of the gaming machines 13A-13H. In another embodiment, the game utilities menu 92 allows the user 54 to modify the volume associated with the bank 15 of the gaming machines 13A-13H and/or the volume associated with a player tracking device associated with the bank 15 of the gaming machines 13A-13H.

In still another embodiment of the present invention, the game utilities menu 92 allows the user 54 to modify the volume associated with the gaming machines 13A-13H in a zone, i.e., a predefined group of banks 15 of the gaming machines 13A-13H and/or the volume associated with a player tracking device associated with the gaming machines 13A-13H in a zone.

In the illustrated embodiment, the game utilities menu 92 includes a lock button 92A, an unlock button 92B, a increase (inc) volume button 92C, a decrease (dec) volume button 92D, a synchronize volume (sync vol) bank button 92E, a synchronize volume (sync vol) zone button 92F, a help button 92G, and a back button 92H. The lock button 92A and the unlock button 92B allow the user 54 to lock the current volume. The inc volume button 92C and the dec volume button 92D allow the player 24 and/or user 54 to modify the volume of the current or selected gaming machine and/or the player tracking device.

Referring back to FIG. 5, the sync vol bank button 92E allows the user 54 to set the volume of all the gaming machines and/or player tracking devices in the corresponding bank to the same level as the currently selected gaming machine or player tracking device. For example the user 54 may selectively adjust the volume associated with the speaker 33 or the speaker 47 associated with the one gaming machine 12 and then synchronize the other machines to the same volume level. The sync vol zone button 92F allows the user 54 to set the volume of all the gaming machines and/or player tracking devices in the corresponding zone to the same level as the currently selected gaming machine or player tracking device.

In one embodiment of the present invention, only employees, i.e., users 54, will be able to modify the volume of the gaming machines 13A-13H and/or player tracking devices 38. Thus, the player tracking device 38 and/or remote device 50 may require the user 54 to log on or otherwise identify and verify their identity. In another embodiment of the present invention, employees and players may be allowed to change the volume. For example, the player may be allowed to change the volume of the gaming machine they are using via the player tracking device 38.

As discussed above, the ability to modify the volume may be provided via the player tracking device 38 and/or one of the remote devices 50. Additionally, the game utility menu 92 may be provided at a workstation (such as computer 18) which may be located at a remote location. The game utility menu 92 (at a remote location) may be used to, for example, one purpose to synch and/or mute or dial down the volume so that a general message (such as an emergency message) may be broadcast. After the general message is broadcast, the volume may be increased.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment, but that the invention will include all embodiments falling within the scope of the appended claims.

The invention claimed is:

1. A remote system for use with a gaming system having a plurality of gaming machines playable by a player, the gaming machines having at least one associated speaker, comprising:

a remote device, the remote device being embodied in a mobile computer which may be carried by a user and having a user interface for use by the user, the user interface including one or more volume buttons and a sync button; and, a controller operably communicating with the gaming machines and the remote device for receiving signals from the remote device over a wireless connection, the device for sending signals to the controller over the wireless connection in response to user actuation of the buttons, the controller for controlling a sound level associated with the speaker associated with one of the gaming machine machines in response to receiving signals from the remote device associated with user actuation of the volume buttons on the remote device and automatically and unilaterally synchronizing the volume of the at least one speaker of the other gaming machines with the volume of the at least one speaker associated with the one gaming machine in response to receiving signals from the remote device associated with user actuation of the sync button.

2. A remote system, as set forth in claim 1, the gaming machine having an associated player tracking device, the at least one associated speaker being associated with the player tracking device.

3. A remote system, as set forth in claim 2, the gaming machine having a game speaker, the controller for selectively controlling the sound level of the at least one associated speaker and/or the game speaker in response to commands input by the user on the remote device.

4. A remote system, as set forth in claim 1, wherein the plurality of gaming machines are arranged in one or more banks, the controller for selectively controlling the sound level of the at least one speaker of one or more banks of gaming machines.

5. A system for use with a gaming system having a plurality of gaming machines and having an associated player tracking device, the gaming machine having at least one associated game speaker, the associated player tracking device having an associated player tracking speaker, comprising:

a device for use by a user and/or player and having a user interface which may be used by the user and/or player, the user interface including one or more volume buttons and a sync button; and, a controller operably communicating with the gaming machine machines, the device for sending signals to the controller in response to user and/or player actuation of the buttons, and the controller for selectively controlling a sound level associated with the gaming speaker and/or the player tracking speaker of a selected one of the gaming machines of in response to receiving signals from the remote device associated with user or player actuation of the volume buttons and automatically and unilaterally synchronizing the volume of the gaming speaker and/or player tracking speaker of the other gaming machines with the volume of the gaming speaker and/or player tracking speaker associated with the one gaming machine in response to receiving signals from the remote device associated with user actuation of the sync button.

6. A system, as set forth in claim 5, wherein the device is a remote device which may be carried by the user.

7. A system, as set forth in claim 5, wherein the device is the player tracking device.

8. A system, as set forth in claim 5, wherein the device is a workstation networked to the gaming system.

9. A remote system, as set forth in claim 5, wherein the gaming machines are arranged in one or more banks, the controller for selectively controlling the sound level of the gaming speaker and/or player tracking speaker of one of the gaming machines and/or one or more banks of gaming machines.

10. A method of controlling a sound level associated with speakers associated with a plurality of gaming machines of a gaming system, comprising:

providing a remote device embodied in a mobile computer which may be carried by a user;

providing a user interface of the remote device, the user interface having one or more volume buttons and a sync button;

sending signals from the remote device over a wireless connection to a controller in response to user actuation of the buttons;

receiving the signals at the controller;

controlling the sound level associated with the speaker associated with one of the gaming machines in response to receiving signals from the remote device associated with user actuation of the one or more volume buttons; and, automatically and unilaterally synchronizing the volume of the at least one speaker associated with the other gaming machines with the volume of the at least one speaker associated with the one gaming machine in response to receiving signals from the remote device associated with user actuation of the sync button.

11. A method, as set forth in claim 10, the gaming machines having an associated player tracking device, the at least one associated speaker being associated with the player tracking device.

12. A method, as set forth in claim 11, the gaming machines having a game speaker, the method including the step of selectively controlling the sound level of the at least one associated speaker and/or the game speaker in response to commands input by the user on the remote device.

13. A method, as set forth in claim 10, wherein the gaming machines arranged in one or more banks, the method including the step of selectively controlling the sound level of the at least one speaker of one of the gaming machines and/or one or more banks of gaming machines.

14. A method for use with a gaming system having a plurality of gaming machines and having an associated player tracking device, each gaming machine having at least one associated game speaker, the associated player tracking device having an associated player tracking speaker, comprising:

providing a device for use by a user and/or player;

providing a user interface on the device, the user interface having one or more volume buttons and a sync button;

sending signals from the device to a controller in response to user actuation of the buttons;

receiving the signals at the controller; and, controlling a sound level associated with the gaming speaker and/or the player tracking speaker of one of the gaming machines in response to receiving signals from the device associated with user actuation of the one or more volume buttons; and, automatically and unilaterally synchronizing the volume of the gaming speaker and/or the player tracking speaker of the other of the gaming machines with the volume of the gaming speaker and/or the player tracking speaker of the one of the gaming machines in response to receiving signals from the remote device associated with user actuation of the sync button.

15. A method, as set forth in claim 14, wherein the device is a remote device which may be carried by the user.

16. A method, as set forth in claim 14, wherein the device is the player tracking device.

17. A method, as set forth in claim 14, wherein the device is a workstation networked to the gaming system.

18. A method, as set forth in claim 14, wherein the plurality of gaming machines are arranged in one or more banks, the method including the step of selectively controlling the sound level of the gaming speaker and/or player tracking speaker of one of the gaming machines and/or one or more banks of gaming machines.

19. A system, as set forth in claim 5, wherein the device is part of the player tracking device, the user interface being implemented thereon.

20. A method, as set forth in claim 10, wherein the remote device is a player tracking device associated with one of the gaming machines.

21. A method, as set forth in claim 14, wherein the device is implemented by one of the player tracking devices.

* * * * *